United States Patent
MacNeish et al.

(10) Patent No.: US 11,673,325 B2
(45) Date of Patent: *Jun. 13, 2023

(54) APPARATUS, SYSTEM AND METHOD FOR AN ADDITIVE MANUFACTURING PRINT HEAD

(71) Applicant: JABIL INC., St. Petersburg, FL (US)

(72) Inventors: William MacNeish, St. Petersburg, FL (US); Erik Gjovik, St. Petersburg, FL (US)

(73) Assignee: JABIL INC., St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/479,335

(22) Filed: Sep. 20, 2021

(65) Prior Publication Data
US 2022/0001610 A1  Jan. 6, 2022

Related U.S. Application Data

(63) Continuation of application No. 17/479,112, filed on Sep. 20, 2021, which is a continuation of application
(Continued)

(51) Int. Cl.
*B29C 64/209* (2017.01)
*B29C 64/386* (2017.01)
(Continued)

(52) U.S. Cl.
CPC .......... *B29C 64/209* (2017.08); *B29C 64/118* (2017.08); *B29C 64/227* (2017.08);
(Continued)

(58) Field of Classification Search
CPC ..... B29C 64/209; B29C 64/205; B29C 64/20; B29C 64/118; B29C 64/106;
(Continued)

(56) References Cited

U.S. PATENT DOCUMENTS

| 6,054,077 A | 4/2000 | Comb et al. |
| 6,547,995 B1 | 4/2003 | Comb et al. |

(Continued)

FOREIGN PATENT DOCUMENTS

| CN | 2014-0188157 | 8/2014 |
| EP | 3238914 | 11/2017 |

(Continued)

OTHER PUBLICATIONS

International Search Report and Written Opinion, dated Apr. 11, 2019 for PCT/US2018/054238.

(Continued)

*Primary Examiner* — Joseph S Del Sole
*Assistant Examiner* — Lawrence D. Hohenbrink, Jr.
(74) *Attorney, Agent, or Firm* — Thomas J. McWilliams; Barnes & Thornburg LLP

(57) ABSTRACT

The disclosure is of and includes at least an apparatus, system and method for a print head for additive manufacturing. The apparatus, system and method may include at least two proximate hobs suitable to receive and extrude therebetween a print material filament for the additive manufacturing, each of the two hobs comprising two halves, wherein each of the hob halves comprises teeth that are offset with respect to the teeth of the opposing hob half; a motor capable of imparting a rotation to at least one of the two hobs, wherein the extrusion results from the rotation; and an interface to a hot end capable of outputting the print material filament after at least partial liquification to perform the additive manufacturing.

19 Claims, 15 Drawing Sheets

Related U.S. Application Data

No. 17/176,078, filed on Feb. 15, 2021, which is a continuation of application No. 16/902,872, filed on Jun. 16, 2020, now Pat. No. 11,420,385, which is a continuation of application No. 16/687,363, filed on Nov. 18, 2019, now Pat. No. 10,919,223, which is a continuation of application No. 15/723,856, filed on Oct. 3, 2017, now Pat. No. 10,919,221.

(51) Int. Cl.

| | | |
|---|---|---|
| *B29C 64/118* | (2017.01) | |
| *B29C 64/227* | (2017.01) | |
| *B33Y 30/00* | (2015.01) | |
| *B29K 101/12* | (2006.01) | |
| *B33Y 50/00* | (2015.01) | |
| *B33Y 50/02* | (2015.01) | |
| *B29C 48/285* | (2019.01) | |
| *B29C 64/321* | (2017.01) | |
| *B29C 64/20* | (2017.01) | |
| *B29C 64/205* | (2017.01) | |
| *B29C 64/106* | (2017.01) | |
| *B29C 64/307* | (2017.01) | |
| *B29C 64/343* | (2017.01) | |
| *B29C 64/393* | (2017.01) | |
| *B29C 48/05* | (2019.01) | |

(52) U.S. Cl.
CPC ............ *B29C 64/386* (2017.08); *B29C 48/05* (2019.02); *B29C 48/2886* (2019.02); *B29C 64/106* (2017.08); *B29C 64/20* (2017.08); *B29C 64/205* (2017.08); *B29C 64/307* (2017.08); *B29C 64/321* (2017.08); *B29C 64/343* (2017.08); *B29C 64/393* (2017.08); *B29K 2101/12* (2013.01); *B33Y 30/00* (2014.12); *B33Y 50/00* (2014.12); *B33Y 50/02* (2014.12)

(58) Field of Classification Search
CPC ... B29C 64/307; B29C 64/321; B29C 64/343; B29C 64/386; B29C 64/393; B29C 48/05; B29C 48/2886; B33Y 30/00; B33Y 50/00; B33Y 50/02; B29K 2101/12
USPC .......................................................... 425/375
See application file for complete search history.

(56) References Cited

U.S. PATENT DOCUMENTS

| | | |
|---|---|---|
| 6,814,907 B1 | 11/2004 | Comb |
| 9,321,609 B2 | 4/2016 | Koop et al. |
| 2007/0003656 A1* | 1/2007 | LaBossiere ............. B29C 48/05 425/375 |
| 2014/0159273 A1* | 6/2014 | Koop .................... B29C 48/154 264/129 |
| 2016/0046081 A1* | 2/2016 | Kim ..................... B29C 64/118 425/143 |
| 2020/0001534 A1 | 1/2020 | Schroeder et al. |

FOREIGN PATENT DOCUMENTS

| | | |
|---|---|---|
| EP | 3326789 A1 | 5/2018 |
| JP | 5039795 | 10/2012 |
| KR | 101441030 | 9/2014 |
| KR | 1020170093431 | 8/2017 |

OTHER PUBLICATIONS

Signmund Arntsonn Tronvoll, Sebastian Popp, Christer Westum Elverum and Torgeir Welo, Investigating Pressure Advance Algorithms for Filament-Based Melt Extrusion Additive Manufacturing: Theory, Practice and Simulations; vol. 25 No. 5—2019 —830-839; Rapid Prototyping Journal 25/5 (2019) 830-839 Emerald Publishing Limited.

* cited by examiner

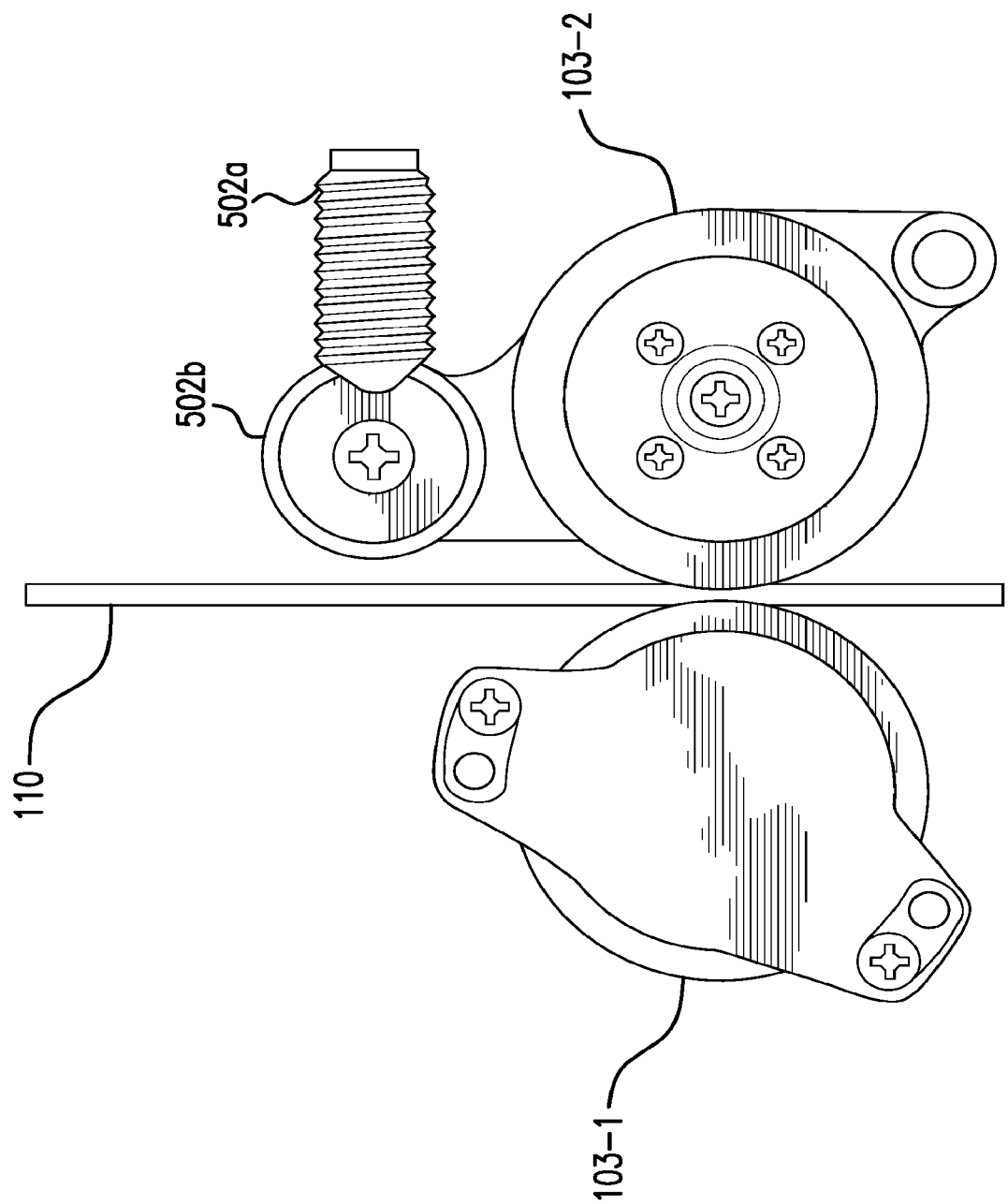

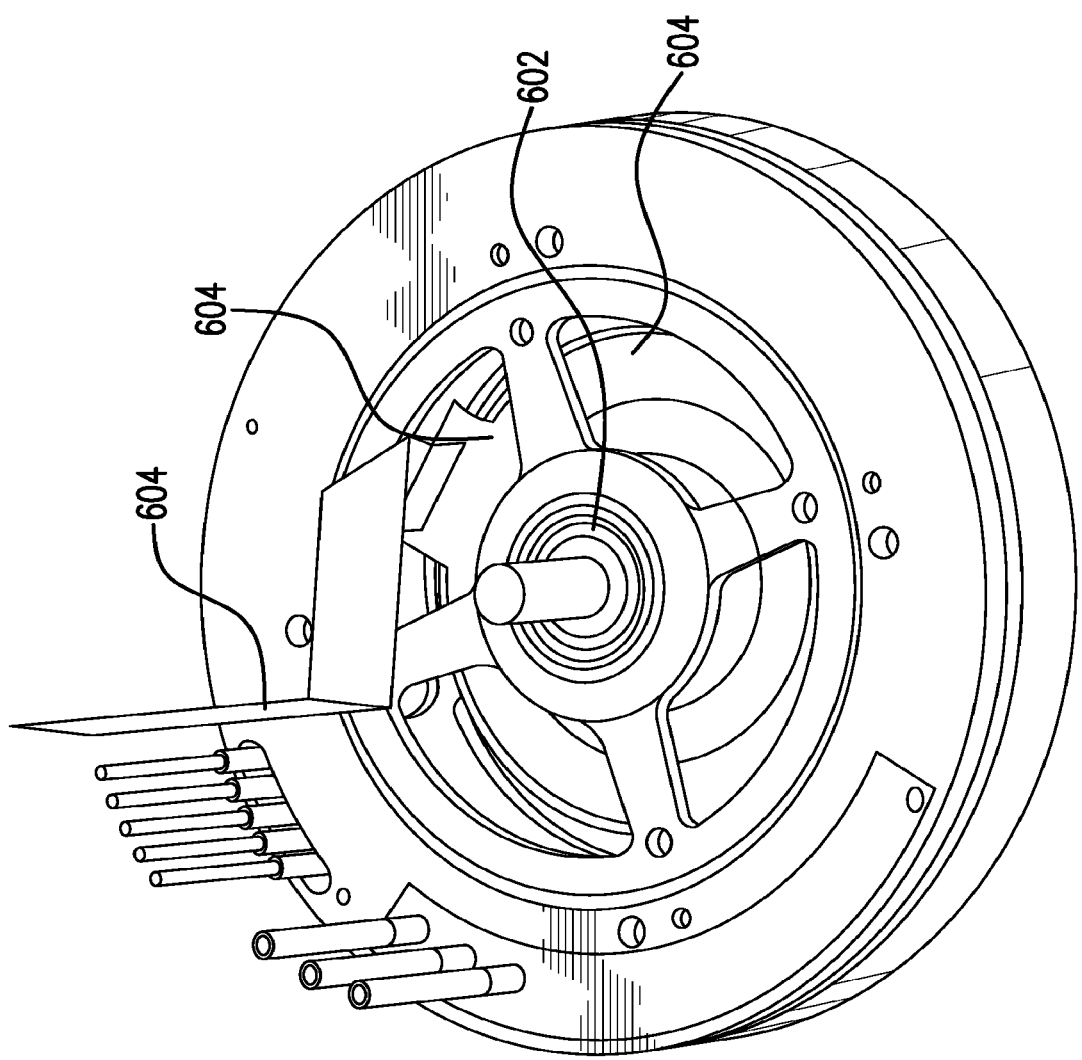

APPARATUS, SYSTEM AND METHOD FOR AN ADDITIVE MANUFACTURING PRINT HEAD

RELATED APPLICATIONS

This application is a continuation application of application Ser. No. 17/479,112; entitled: APPARATUS, SYSTEM AND METHOD FOR AN ADDITIVE MANUFACTURING PRINT HEAD, filed Sep. 20, 2021 which is a continuation application of Ser. No. 17/176,078, entitled: APPARATUS, SYSTEM AND METHOD FOR AN ADDITIVE MANUFACTURING PRINT HEAD, filed Feb. 15, 2021, which is a continuation application of application Ser. No. 16/902,872, entitled: APPARATUS, SYSTEM AND METHOD FOR AN ADDITIVE MANUFACTURING PRINT HEAD, filed on Jun. 16, 2020, which is a continuation application of application Ser. No. 16/687,363, entitled APPARATUS, SYSTEM AND METHOD FOR AN ADDITIVE MANUFACTURING PRINT HEAD, filed on Nov. 18, 2019, which is a continuation application of application Ser. No. 15/723,856, entitled APPARATUS, SYSTEM AND METHOD FOR AN ADDITIVE MANUFACTURING PRINT HEAD, filed Oct. 3, 2017, the contents of which is incorporated by reference in their entireties herein.

BACKGROUND

Field of the Disclosure

The present disclosure relates to additive manufacturing, and, more specifically, to an apparatus, system and method for an additive manufacturing print head.

Description of the Background

Additive manufacturing, including three dimensional printing, has constituted a very significant advance in the development of not only printing technologies, but also of product research and development capabilities, prototyping capabilities, and experimental capabilities, by way of example. Of available additive manufacturing (collectively "3D printing") technologies, fused deposition of material ("FDM") printing is one of the most significant types of 3D printing that has been developed.

FDM is an additive manufacturing technology that allows for the creation of 3D elements on a layer-by-layer basis, starting with the base, or bottom, layer of a printed element and printing to the top, or last, layer via the use of, for example, heating and extruding thermoplastic filaments into the successive layers. Simplistically stated, an FDM system includes a print head from which the print material filament is fed to a heated nozzle, an X-Y planar control form moving the print head in the X-Y plane, and a print platform upon which the base is printed and which moves in the Z-axis as successive layers are printed.

More particularly, the FDM printer nozzle heats the thermoplastic print filament received from the print head to a semi-liquid state, and deposits the semi-liquid thermoplastic in variably sized beads along the X-Y planar extrusion path plan provided for the building of each successive layer of the element. The printed bead/trace size may vary based on the part, or aspect of the part, then-being printed. Further, if structural support for an aspect of a part is needed, the trace printed by the FDM printer may include removable material to act as a sort of scaffolding to support the aspect of the part for which support is needed. Accordingly, FDM may be used to build simple or complex geometries for experimental or functional parts, such as for use in prototyping, low volume production, manufacturing aids, and the like.

However, the use of FDM in broader applications, such as medium to high volume production, is severely limited due to a number of factors affecting FDM, and in particular affecting the printing speed, quality, and efficiency for the FDM process. As referenced, in FDM printing it is typical that a thermoplastic is extruded from the print head, and then heated and pushed outwardly from a heating nozzle, under the control of the print head, onto either a print plate/platform or a previous layer of the part being produced. The nozzle is moved about by the robotic X-Y planar adjustment of the print head in accordance with a pre-entered geometry, such as may be entered into a processor to control the robotic movements to form the part desired.

Thus, current limitations on the cost, efficiency, and performance of additive manufacturing often occur due to the nature of known print heads, such as those print heads typically provided in FDM printing. In short, in a typical known print head, print material is fed from a spool through two print hobs that serve to extrude the print material toward the "hot end" of the printer. In known embodiments, a stepper motor turns both adjoining hobs having the print material therebetween in opposite directions in order to feed the print material from the spool to the hot end. However, the step-wise nature of current print material feeds often scores the filament, and further subjects the print material filament to various undesirable effects, such as compression, friction, and lag. Lagging of the print material may be particularly detrimental, at least in that the print material may curl or otherwise re-spool at the output from or input to the hobs, thereby jamming the printer. The nature of the hobs presently in use exacerbates these adverse printing effects.

Therefore, the need exists for an apparatus, system, and method for an additive manufacturing print head.

SUMMARY

The disclosure includes at least an apparatus, a system and method for a print head for additive manufacturing. The apparatus, system and method may include at least two proximate hobs suitable to receive and extrude therebetween a print material filament for the additive manufacturing, each of the two hobs comprising two opposing halves, wherein each of the hob halves comprises teeth that are offset with respect to the teeth of the opposing hob half; a motor capable of imparting a rotation to at least one of the two hobs, wherein the extrusion results from the rotation; and an interface to a hot end capable of outputting the print material filament after at least partial liquification to perform the additive manufacturing.

Thus, the disclosed embodiments provide an apparatus, system, and method for an apparatus, system and method for an additive manufacturing print head.

BRIEF DESCRIPTION OF THE DRAWINGS

The disclosed non-limiting embodiments are discussed in relation to the drawings appended hereto and forming part hereof, wherein like numerals indicate like elements, and in which:

FIG. 5 illustrates a hob system for an additive manufacturing print head;

FIGS. 6A and 6B illustrate a servo motor for rotating one or more hobs of an additive manufacturing print head;

DETAILED DESCRIPTION

Figure 1:
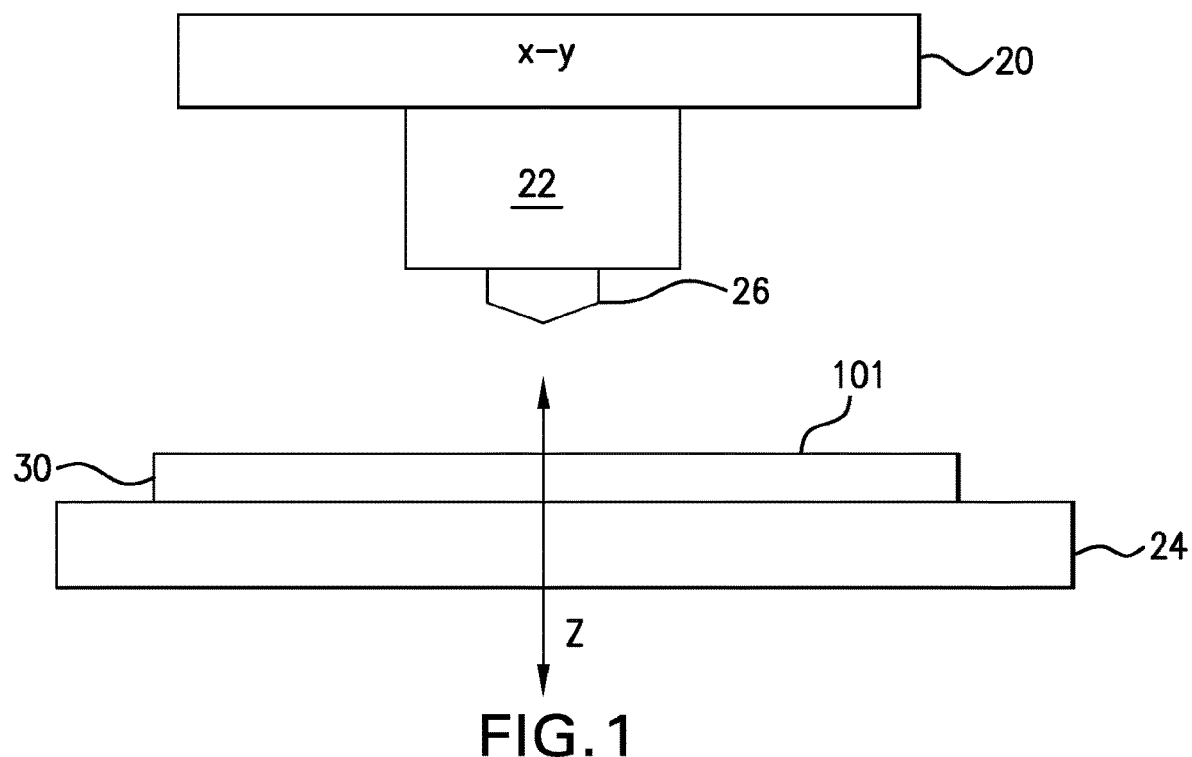
FIG. 1 is an illustration of an additive manufacturing printer.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "engaged to", "connected to" or "coupled to" another element or layer, it may be directly on, engaged, connected or coupled to the other element or layer, or intervening elements or layers may be present, unless clearly indicated otherwise. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

As discussed herein, improved print head embodiments are sought: in which print head speed may be improved without the referenced detrimental effects, such as lagging or jamming; in which printing precision may be improved; in which printing responsiveness is improved; and in which weight of the print head is decreased. Print head speed may be improved in the disclosed embodiments and their equivalents to, for example, 100 mm$^3$ per second; precision may be improved, such as to 0.0003 mm$^3$ per count, with a 10 micrometer trace length resolution at a 400 micrometer wide and 100 micrometer thick trace; responsiveness may be improved, such as to a 1 kHz system response with a 2 microsecond slam stop; and the weight of the print head may be improved, such as to on the order of or less than 600 grams.

FIG. 1 is a block diagram illustrating an exemplary FDM printer 100. In the illustration, the printer includes an X-Y axis driver 102 suitable to move the print head 104, and thus the print nozzle 106, in a two dimensional plane, i.e., along the X and Y axes. Further included in the FDM printer 100 for additive manufacturing are the aforementioned print head 104 and print nozzle 106. As is evident from FIG. 1, printing may occur upon the flow of heated print material outwardly from the print nozzle 106 along a Z axis with respect to the X-Y planar movement of the X-Y driver 102. Thereby, layers of print material 110 may be provided from the print nozzle 106 onto the build plate 111 along a path dictated by the X-Y driver 102.

Figure 2:
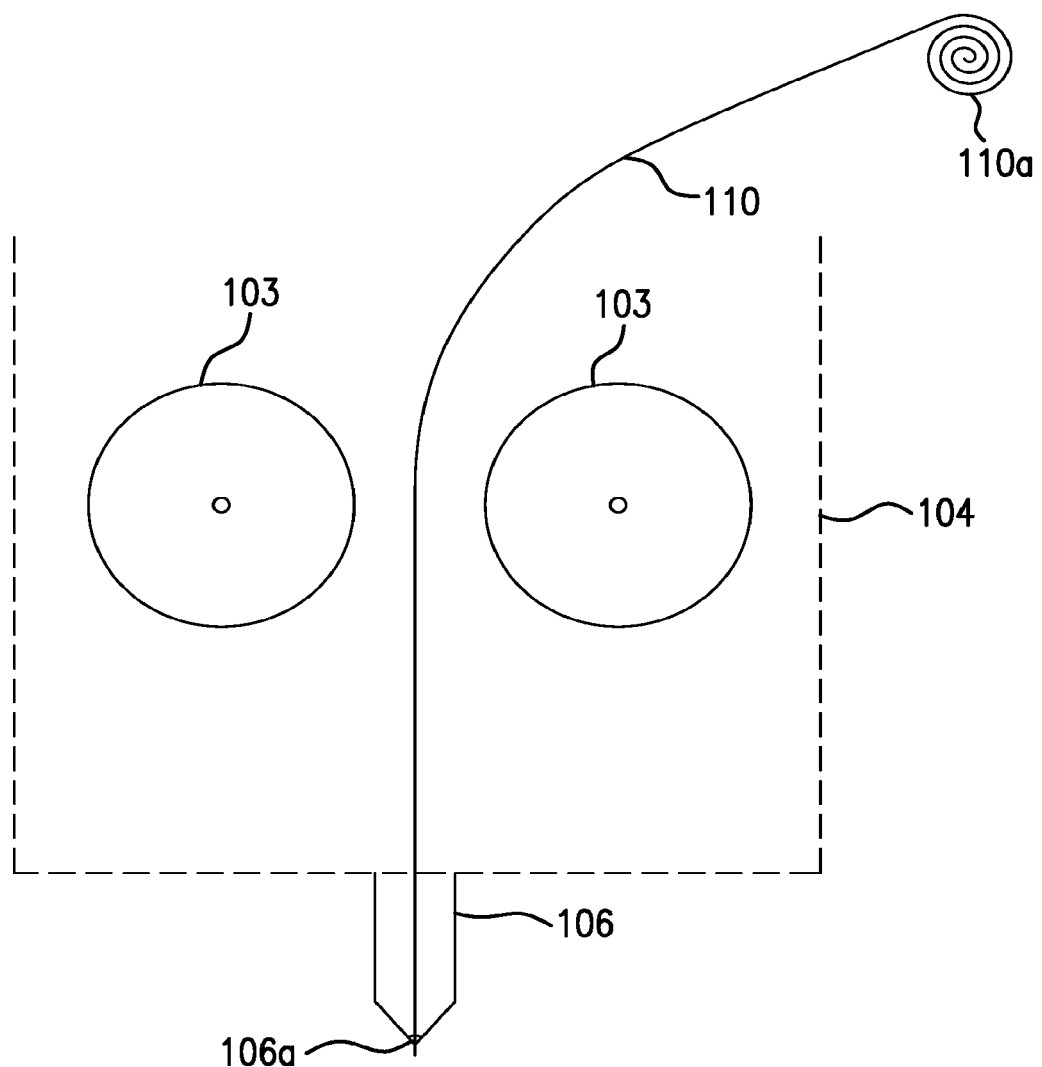
FIG. 2 is an illustration of an exemplary additive manufacturing system.

FIG. 2 illustrates with greater particularity a print head 104 and print nozzle 106 system for an exemplary additive manufacturing device, such as a 3-D printer, such as a FDM printer. As illustrated, the print material 110 is extruded via hobs 103 of the head 104 from a spool of print material 110a into and through the heated nozzle 106. As the print nozzle 106 heats the print material 110, the print material 110 is at least partially liquefied for output from an end port 106a of the print nozzle 106 at a point along the print nozzle 106 distal from the print head 104. Thereby, the extruded print material 110 is "printed" outwardly from the end port 106*a* via the Z axis along a X-Y planar path determined by the X-Y driver 102 (see FIG. 1) connectively associated with the print head 104.

The embodiments may provide the foregoing improvements to the print head 104 by, among other things, providing improved hobs 103 and hob drivers 302 to grip the print material 110 from the print material spool 110*a*. FIG. 3 illustrate the "engagement length" 304 of a hob with a print material 110, as those terms are used herein. In the current art, this engagement length 304*a* typically results from hobs having diameters in the range of 8 to 12 or 15 mm.

Figure 3A:
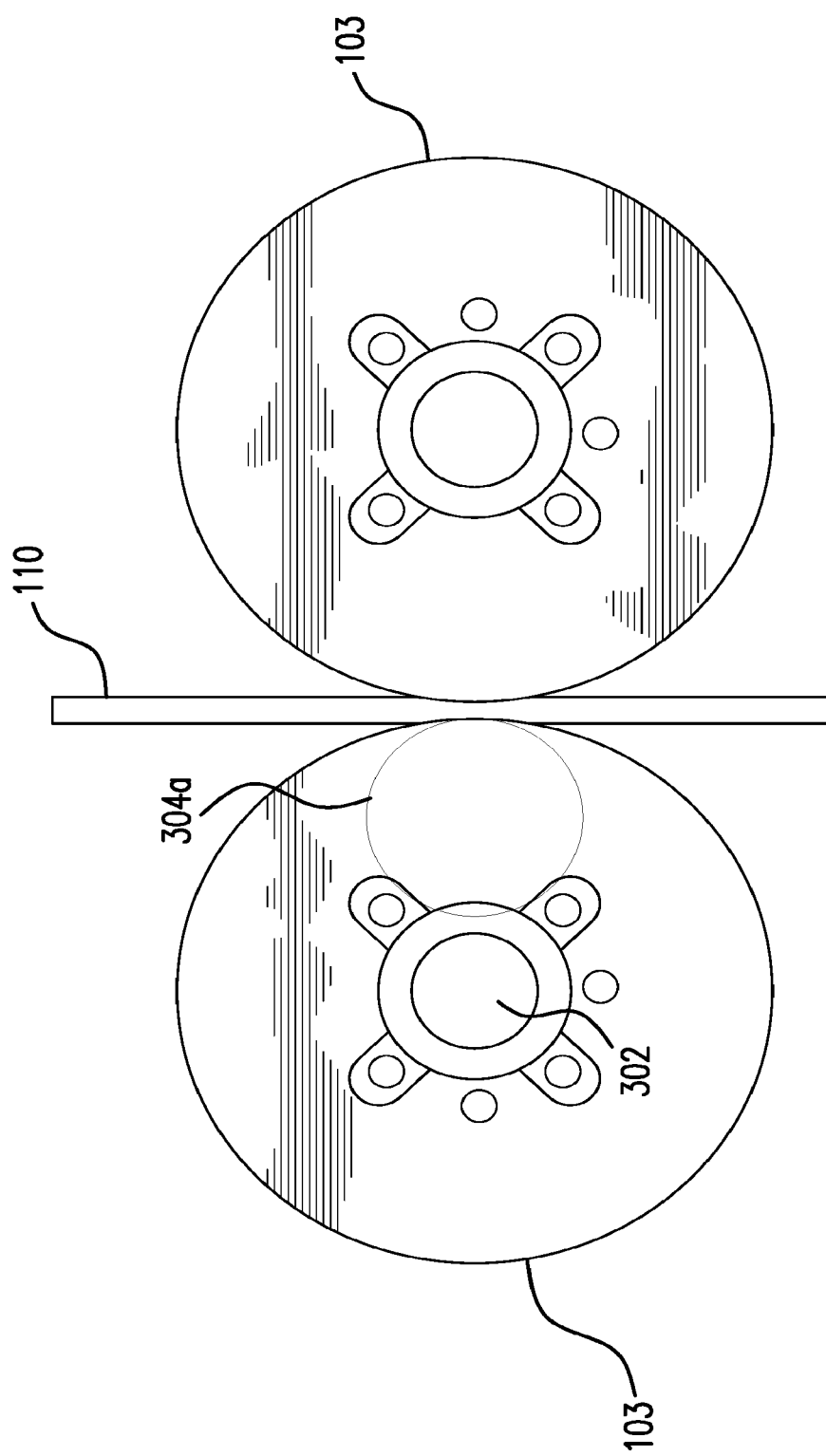
FIGS. 3A and 3B illustrate hobs of an additive manufacturing print head.
Figure 3B:
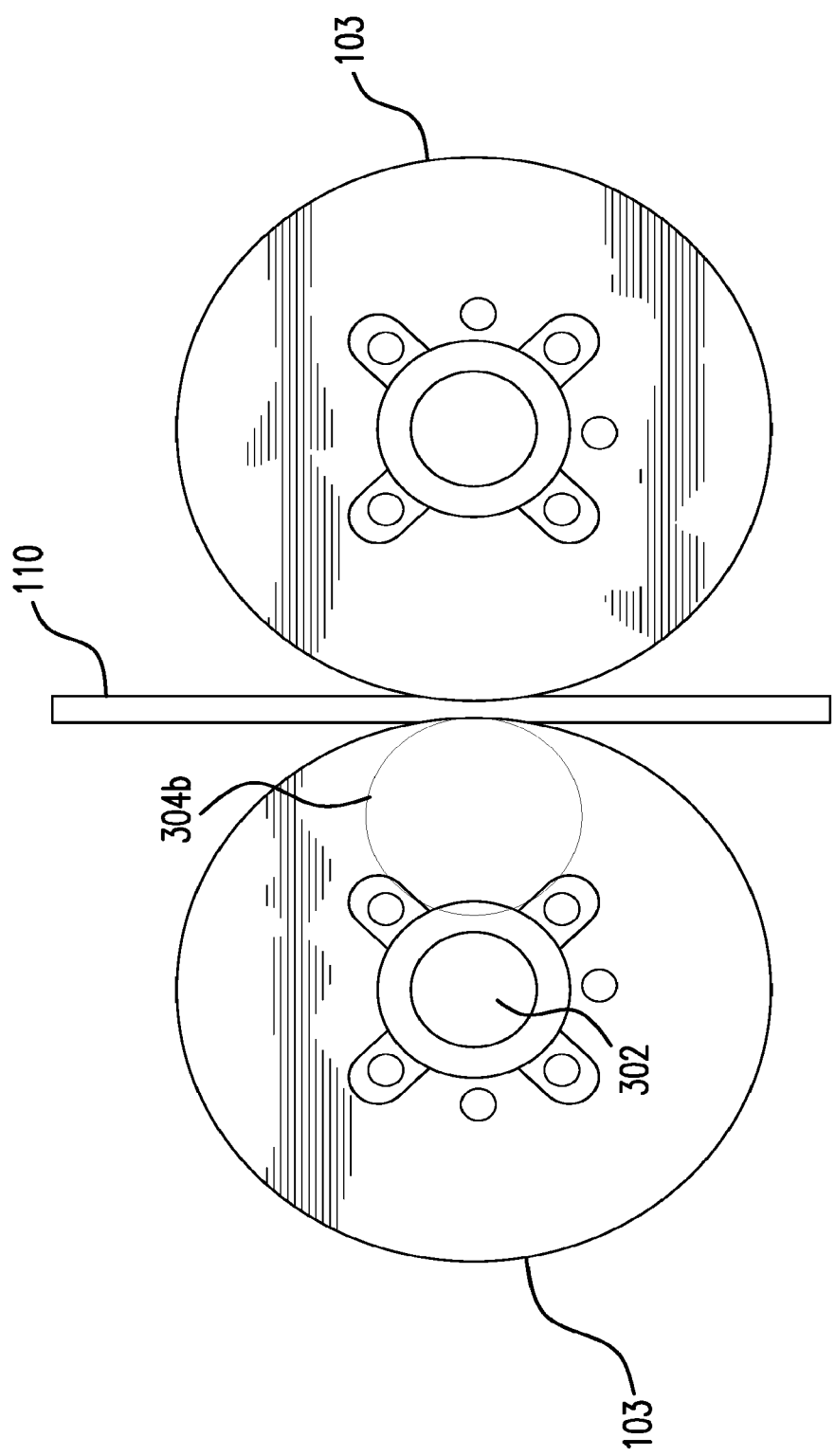

The gripping of the print material 110 by hobs 103 having smaller diameters of 8 to 12 mm, and hence smaller engagement lengths 304*a*, is illustrated with respect to FIG. 3A. Certain of the embodiments improve the engagement length 304 by increasing the engagement surface, that is, by increasing the diameter of the hobs 103 to enhance the engagement length 304 with the printed material filament 110, as illustrated in FIG. 3B. Such increased diameter hobs 103 may, for example, have a diameter in the 20-40 mm range.

Figure 4A:
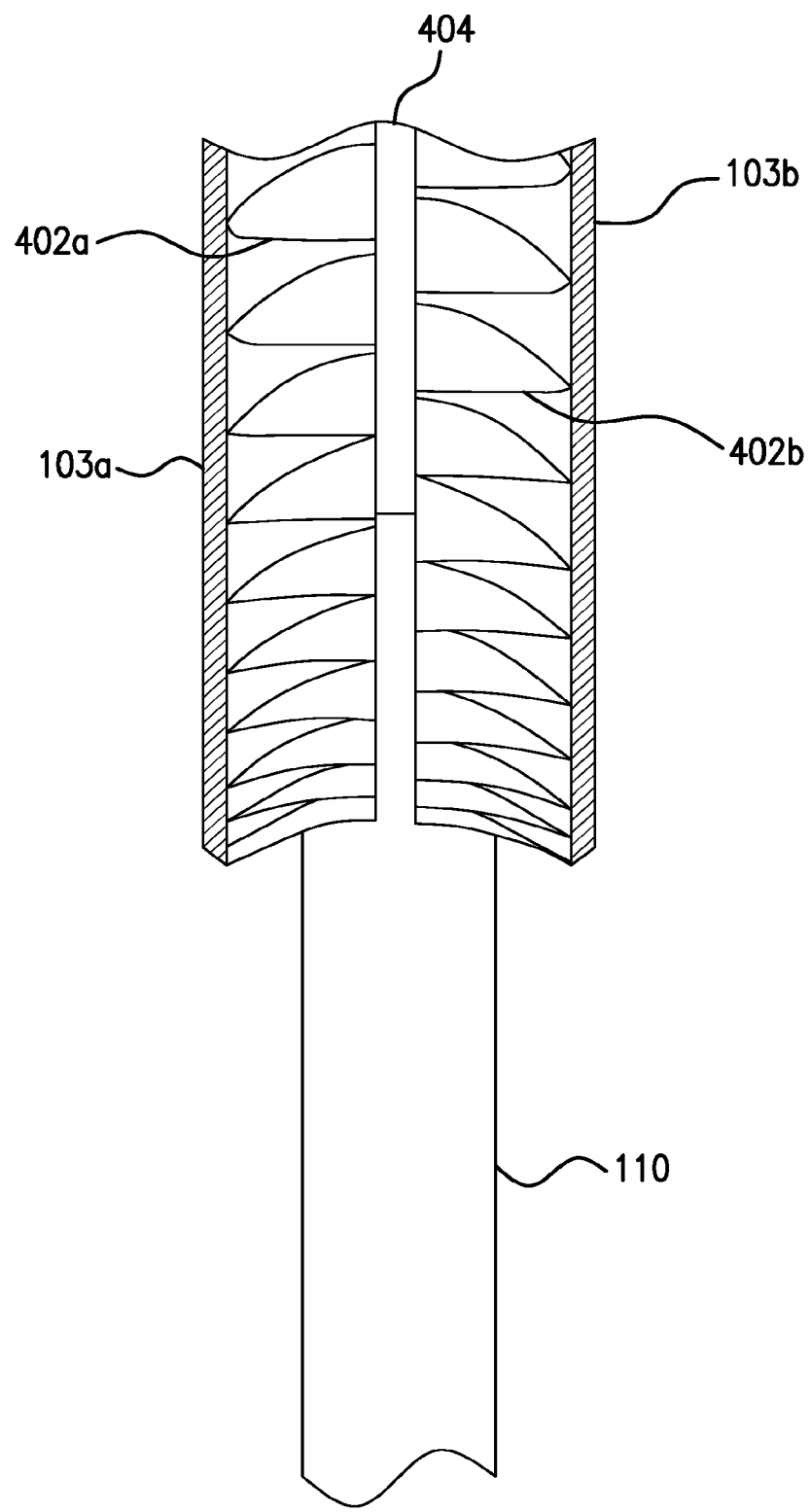
FIGS. 4A and 4B illustrate hobs of an additive manufacturing print head.
Figure 4B:
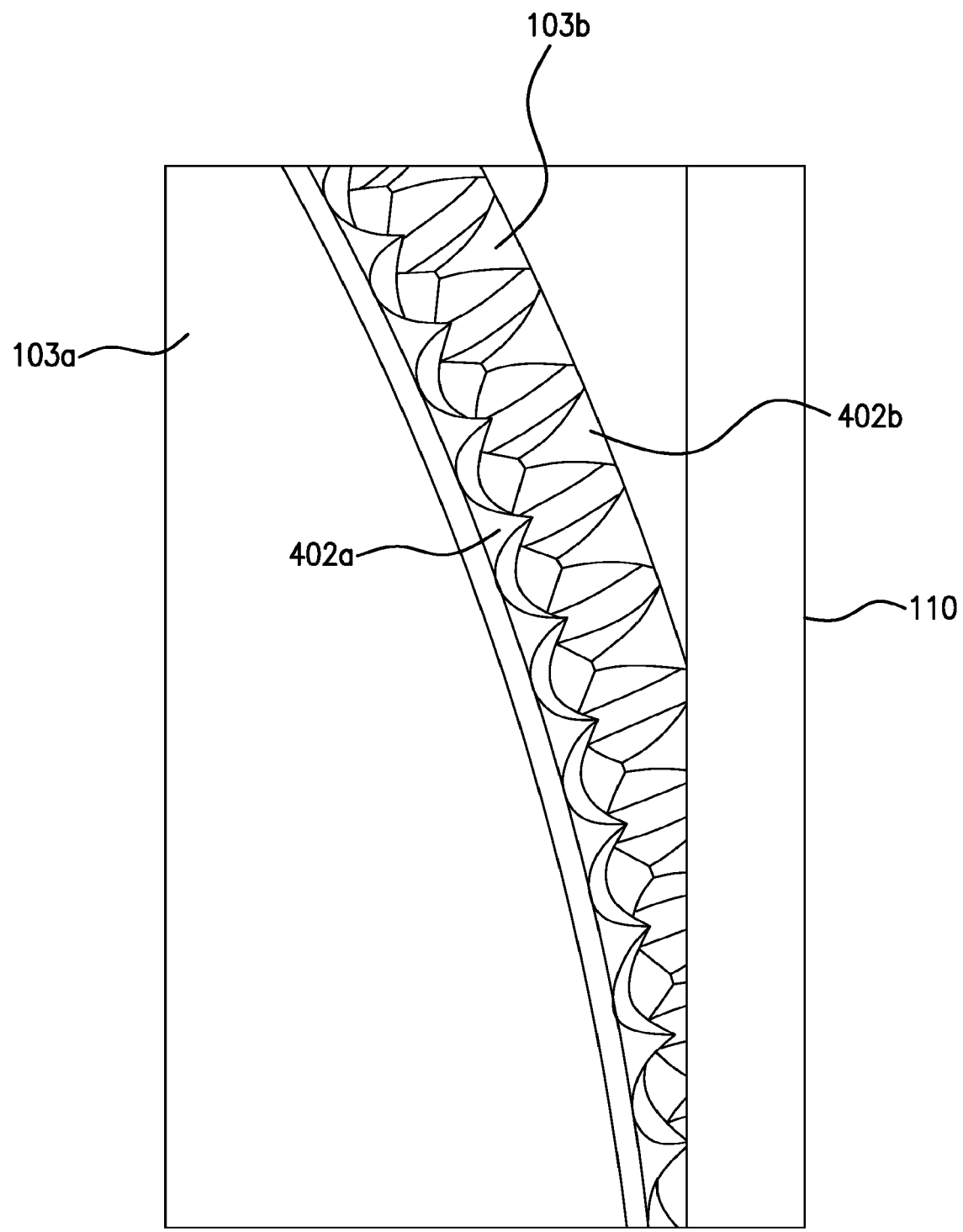

Further and as illustrated in the exemplary embodiments of FIGS. 4A and 4B, each hob 103 may have opposing half hob 103*a* and 103*b*. A series of teeth 402*a*, 402*b* may be provided on each hob 103, or on each half hob 103*a*, 103*b*. The teeth 402*a* and 402*b* may, by way of non-limiting example, have sharpened surfaces, such as in order to enhance grip on the print material 110.

In certain embodiments, the teeth 402*a* and 402*b* of the opposing half hobs 103*a* and 103*b* may be offset with respect to one each other by a predetermined offset amount, such as 180 degrees. More particularly, such misalignment may be between 5 degrees and 180 degrees, and may occur by sheer random association of the two opposing hob halves 103*a* and 103*b*. Moreover, the two opposing hob halves 103*a* and 103*b* may be provided with a shim therebetween, such that the shim may be selected based on the desired grip level to be provided by the hob 103 once the two opposing hob halves 103*a* and 103*b* are joined.

Of note, overly sharpened teeth 402 and 402*b* may bite undesirably significantly into the print material 110, thereby increasing drag, and as such teeth 402*a* and 402*b* may be sandblasted, plated, or offset but with non-sharpened surfaces (such as square or spherical filament grip surfaces), or offset but with varying teeth shapes (such as varying between triangular, square, and spherical grip surfaces), and so on.

Of course, opposing hob halves 103*a*, 103*b* may be consistently manufactured in the same manner, and thus the teeth 402*a*, 402*b* may be offset only upon interconnection of the opposing hob halves 103*a*, 103*b*. Therefore, adjustability, such as an adjustable shim 404, may be provided between opposing hob halves 103*a*, 103*b* in order to adjust the grip level of the hobs 103 onto the print material 110. Increased grip provided by the hobs 103 may allow for a correspondent decrease in the diameter of the hobs 103 over that referenced above in relation to FIG. 3, due, in part, to the decreased necessity of an increase in engagement length 304 in light of the enhanced grip. Additionally and alternatively, the number of teeth 402*a* and 402*b* in each opposing hob half 103*a* and 103*b* may be reduced, but with the teeth 402 still staggered, so long as an engagement length 304 along the print material 110 maintains a predetermined level of friction in order to meet the characteristics discussed throughout.

In accordance with the foregoing, very high levels of grip on print material 110 with very low loss (i.e., drag/friction) may thus provided by certain of the embodiments. Moreover, diameter of the hobs 103 may be adjusted over the known art to vary across print environments to provide only the necessary level of torque, such as for a given print material 110 or a given printing technique. The foregoing may also lead to decreased costs, such as due to the ready replaceability of the hobs 103, which may also improve the time needed to clean and service a print head 104.

FIG. 5 illustrates an exemplary assembly for hobs 103 according to certain of the embodiments. As illustrated, only the "drive hob" 103-1 may be driven in certain of the embodiments, whereas the opposing hob 103-2 may be passive, and the driven hob 103-1 may include, in association therewith, one or more force adjustments 502 to adjust the force applied by the hobs 103, such as particularly by the passive hob 103-2, to the print material 110. More particularly, the force adjustment 502 may be provided not only on the non-drive hob 103-2, but additionally on the driven hob 103-1, or on both hobs.

The non-driven hob 103-2 may be spring loaded, cammed, or otherwise pressed against the driven hob 103-1 to both provide optimal grip of the print material 110 between the hobs 103 and/or to provide a relative adjustability to allow for differing filament sizes without necessitating mechanical readjustment of the distance between the hob filament grip. For example, the force adjustment 502 may include a dedicated force adjustment 502*a* and/or an open/close cam 502*b* that is provided in association with one of the hobs 103-1 and 103-2. In such embodiments, when the cam 502*b* closes, the hobs 103 are physically more closely associated with the print material 110 due to the forced proximity to one another. An additional or secondary force adjustment 502*a* may move toward or away from the cam 502*b*, such as by a rotational adjustment to a threaded adjustable force element 502*a* as shown by way of non-limiting example, to thereby press (or depress) the non-driven hob 103-2 associated with the force adjustment 502 closer to or further from the driven hob 103-1, which necessarily modifies the force applied by both hobs 103 to the print material 110.

As referenced throughout, a servo motor 602 may be employed to drive the driven hob(s) 103-1 according to certain of the embodiments, rather than the stepper motor of the known art (noting that only one hob may be driven, as referenced above, while the non-driven hob(s) 103-2 may be spring loaded to apply the requisite force to the print material 110. More specifically, in the known art a stepper motor is typically used to drive the driven hob(s) 103-1, and consequently the typical open loop drive of a stepper motor continues to drive at the same pace regardless of slippage, counterforce, or the like. In stark contrast to known stepper motors, the use of a servo motor 602 in certain of the disclosed embodiments may provide, for example, 500 Hz of servo-mechanical band width, and filament grip may be still further enhanced through the use of a motor encoder in conjunction with the servo motor 602, as discussed further herein below. That is, the use of a motor encoder 604 may allow for monitoring for slippage, motor counterforce, or the like so that adjustments may be made to maintain a desired and consistent print material 110 feed speed.

Further, the use of a single driven hob 103-1 in conjunction with a servo motor 602 may allow for a direct drive of the driven hob 103-1, i.e., a gearless hob drive (not shown). Although a gearless hob drive may slightly increase the distance from the center axis of the driven hob to the mid-melt point, such as to allow sufficient space for mounting of the servo motor 602 (which may be direct drive), a gearless drive nevertheless further enhances the avoidance of crimping and jamming of the print material 110.

Figure 6A:
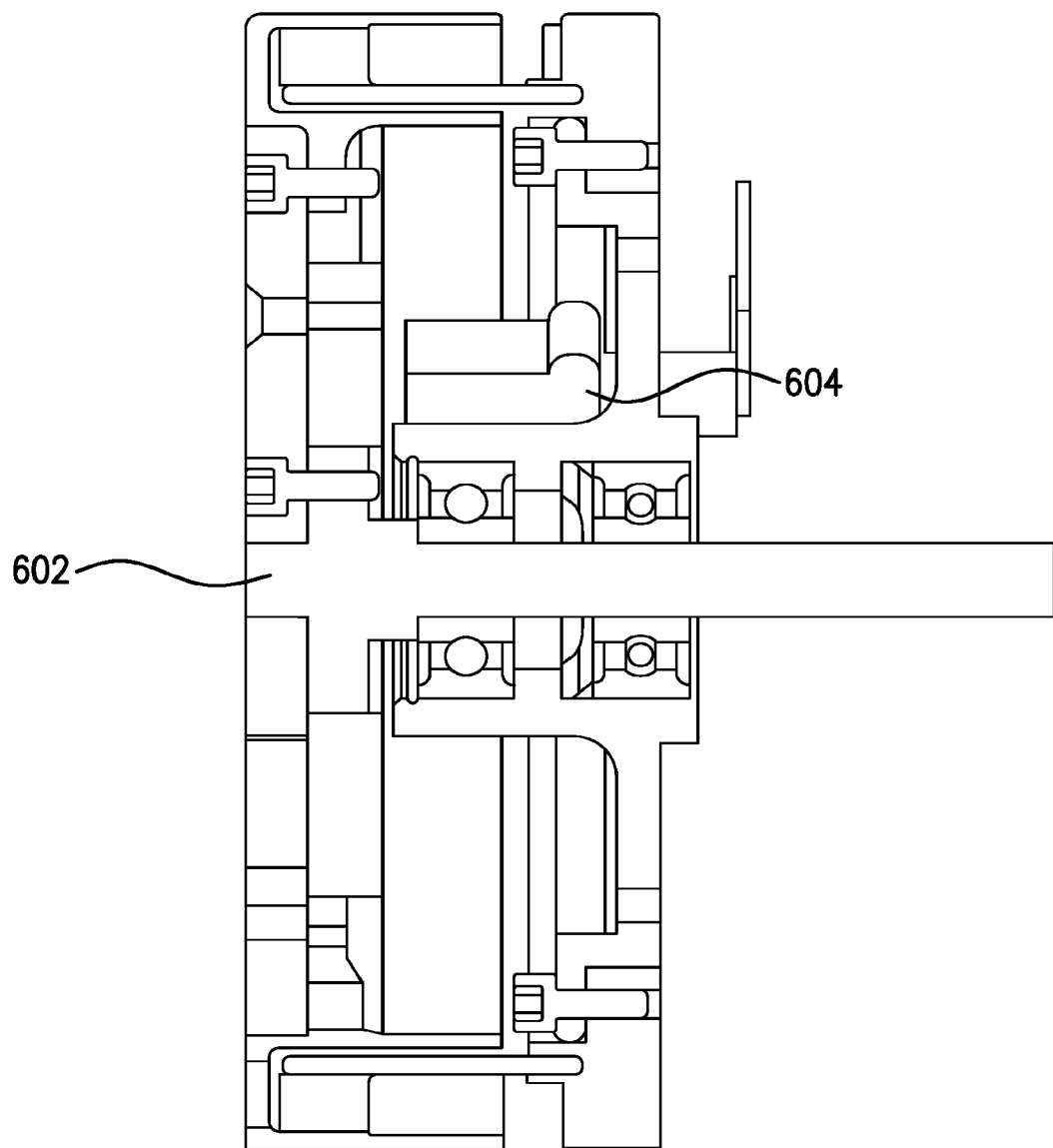

FIGS. 6A and 6B illustrate a servo motor 602 that may, in certain of the embodiments, include one or more motor encoders 604, such as in order to allow for measurement and calibration of the motor drive. The servo-mechanical coupling provided in the embodiments between the hobs 103 and the print nozzle 106 may be appreciably improved over the known art through the use of an servo motor 602, which may be encoded, which allows for enhanced feed rate, such as 1 kHz or more, in part due to the high torque available due to the improved servo mechanical relationship.

Accordingly, high torque motor drive may be provided in certain of the embodiments. In addition to the torque level, the speed and responsiveness to torque of the driver motor may be of importance in the embodiments, because, as stated above, it is preferable that the motor be suitable to quickly provide high torque, and then to quickly cease providing of torque, in order to provide a more refined print control. Suitable motors may include, by way of non-limiting example, a 20 times torque density motor.

As referenced, a motor encoder 604, such as an integrated magnetic encoder, may be provided in association with the hobs 103 and/or the servo motor 602. The providing of a motor encoder 604 provides for enhanced printing resolution and control due to improved motor position assessment, and thus improved torque control, as will be understood to those of ordinary skill in the pertinent arts.

In additional and alternative embodiments, one or more of the hobs 103 may be conductive. Accordingly, one hob may be provided as an anode, while the material filament may serve as the cathode, or one hob may serve as the anode while the other hob serves as the cathode. Accordingly, the print material 110 may be electrically heated between a cathode and an anode before reaching the hot end, or the print material 110 may be charged or otherwise electrified in order to improve adhesion or impart electrical charge to the build, by way of non-limiting example.

Figure 7A:
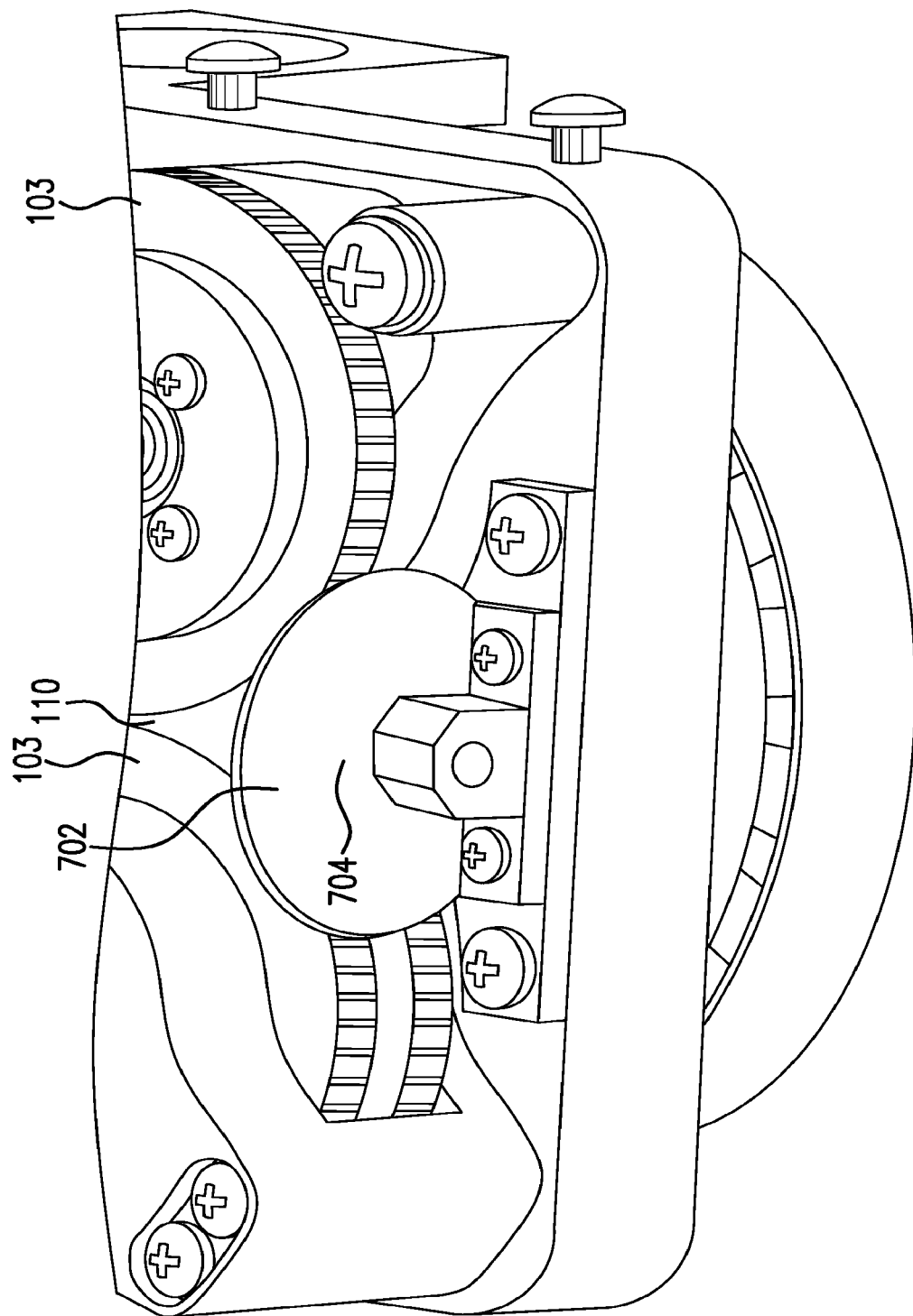
FIGS. 7A and 7B illustrate an exemplary hot end feed path in an additive manufacturing print head.
Figure 7B:
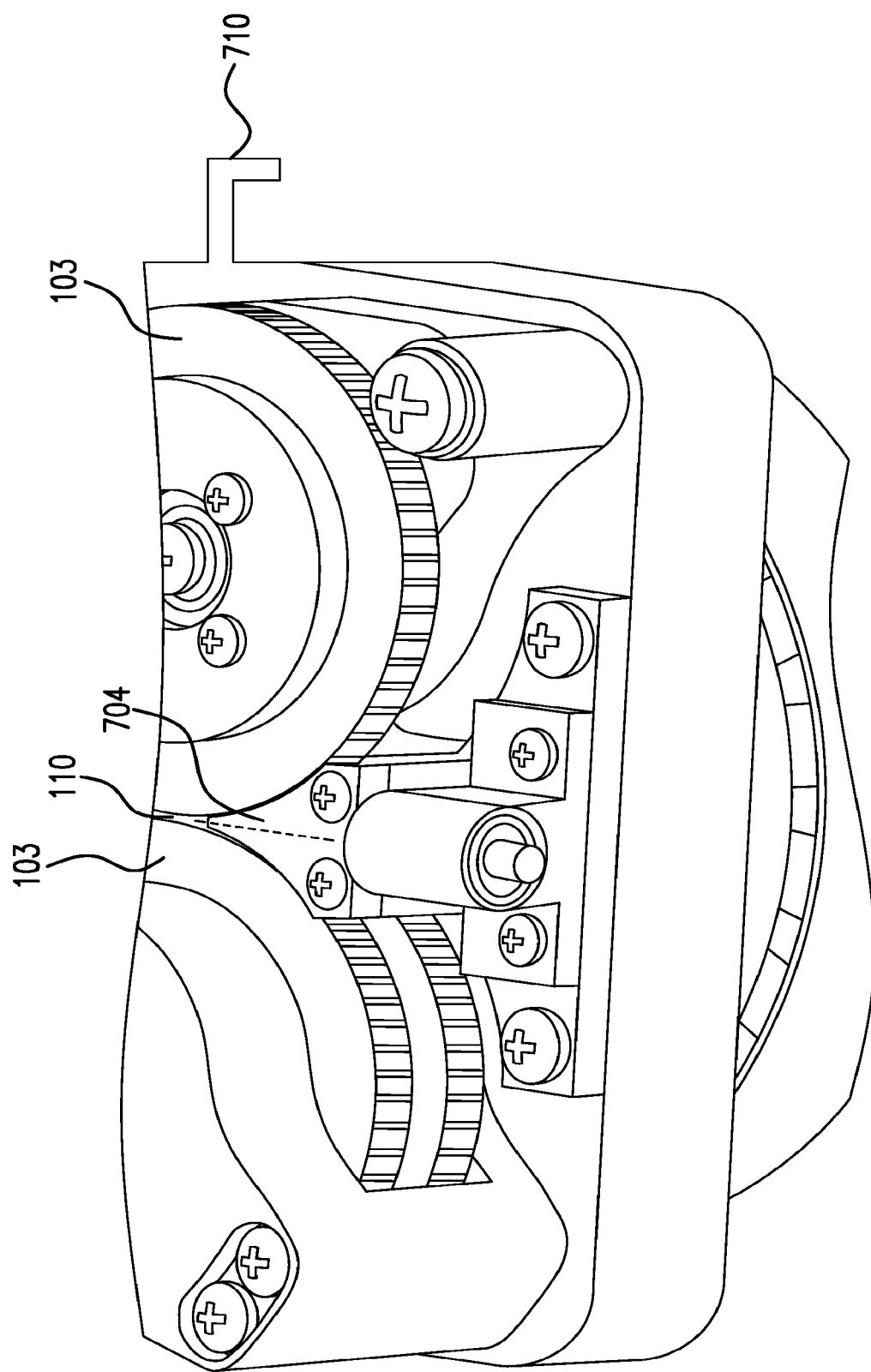

By way of further example and in order to avoid respooling/crimping, the feed-in may be shimmed 702 in at approximately ~0.010" below hobs 103, or may otherwise be presented with a dictated path 704, as illustrated in FIGS. 7A and 7B. The feed hardware in these and others of the embodiments may, by way of non-limiting example, be formed of glass, sapphire, 440C, WC, Al2O3, or ceramic. Moreover, such materials may further serve to minimize crimping or buckling wherever the filament runs through the feed apparatus, such as at upper and lower receivers, the hobs 103, the feed tube, etc.

An air feed 710 may be provided in association with the print head 104, as is illustrated in FIG. 7B. By way of non-limiting example, this air feed 710 may be used for: cooling the extruder motor; cooling the hobs; cooling the nozzle.

Figure 8:
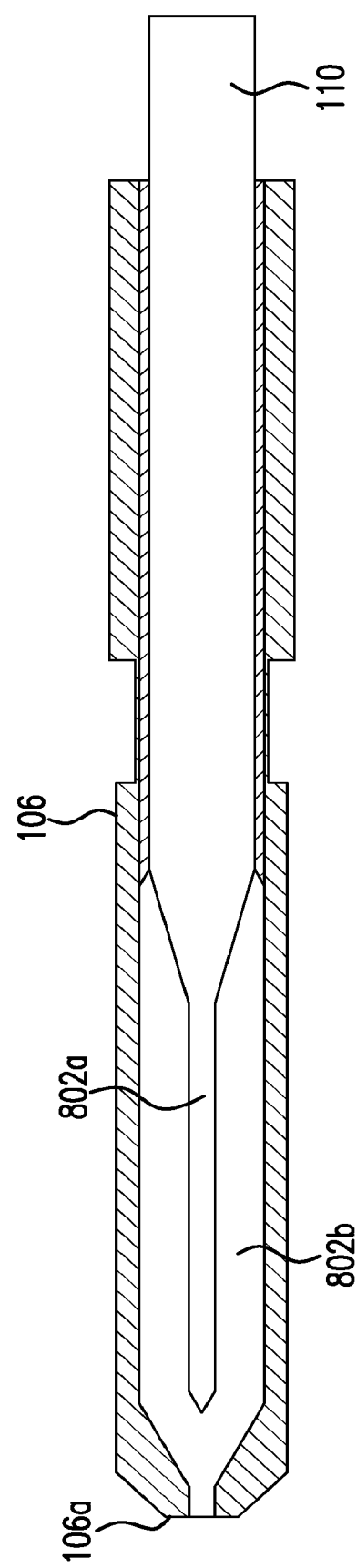
FIG. 8 illustrates the zoned melting of a hot end in an additive manufacturing system.

More particularly, the print head 104 serves the function of extruding the print material 110 into the hot end, which includes print nozzle 106, at the speed dictated by the rotation of the hobs 103 associated with the print head 104. More particularly, it is desirable that the print head 104 be enabled to go from significant print material 110 feed speed to zero speed, and from zero to significant print material 110 feed speed, readily, as discussed herein throughout. More specifically and as illustrated in FIG. 8, the print material 110 is fed by the print head 104 into the hot end 106 in such a manner that "zones" are created within the hot end that includes print nozzle 106 which enable the discharge of the melted print material 110 from the print port 106*a* of the print nozzle 106 of the hot end.

As shown, the print head 104 feeds a solid print material 110 into the upper portion of the hot end, and the heat applied by the hot end to the print material 110 causes a portion of the print material 110 to melt within the hot end. A cone of unmelted print material 110 then occurs within a solid zone 802*a*, and is surrounded by the melted print material 110 in a melt zone 802*b*, such that, as long as the unmelted print material 110 cone within the solid zone 802*a* does not sufficiently penetrate the melt zone 802*b* so as to reach the nozzle port 106*a*, printing may continue. However, if the speed at which the hobs 103 of the print head 104 feed the print material 110 to the hot end, which includes print nozzle 106, exceeds the melting capabilities of the print nozzle 106, the solid zone 802*a* of the print material 110 will penetrate through the melt zone 802*b* and clog the nozzle port 106*a*. Thereby, a physical and algorithmic association of the servo rate of rotation of the hobs and the capacity of the hot end to melt the print material 110 for printing may be required in the disclosed embodiments. The algorithmic association may be maintained using one or more electrical processors accessing one or more sensors, such as may generate data for use in the algorithm regarding the servo motor 602, the motor encoder 604, and so on, as discussed further hereinbelow.

Figure 9:
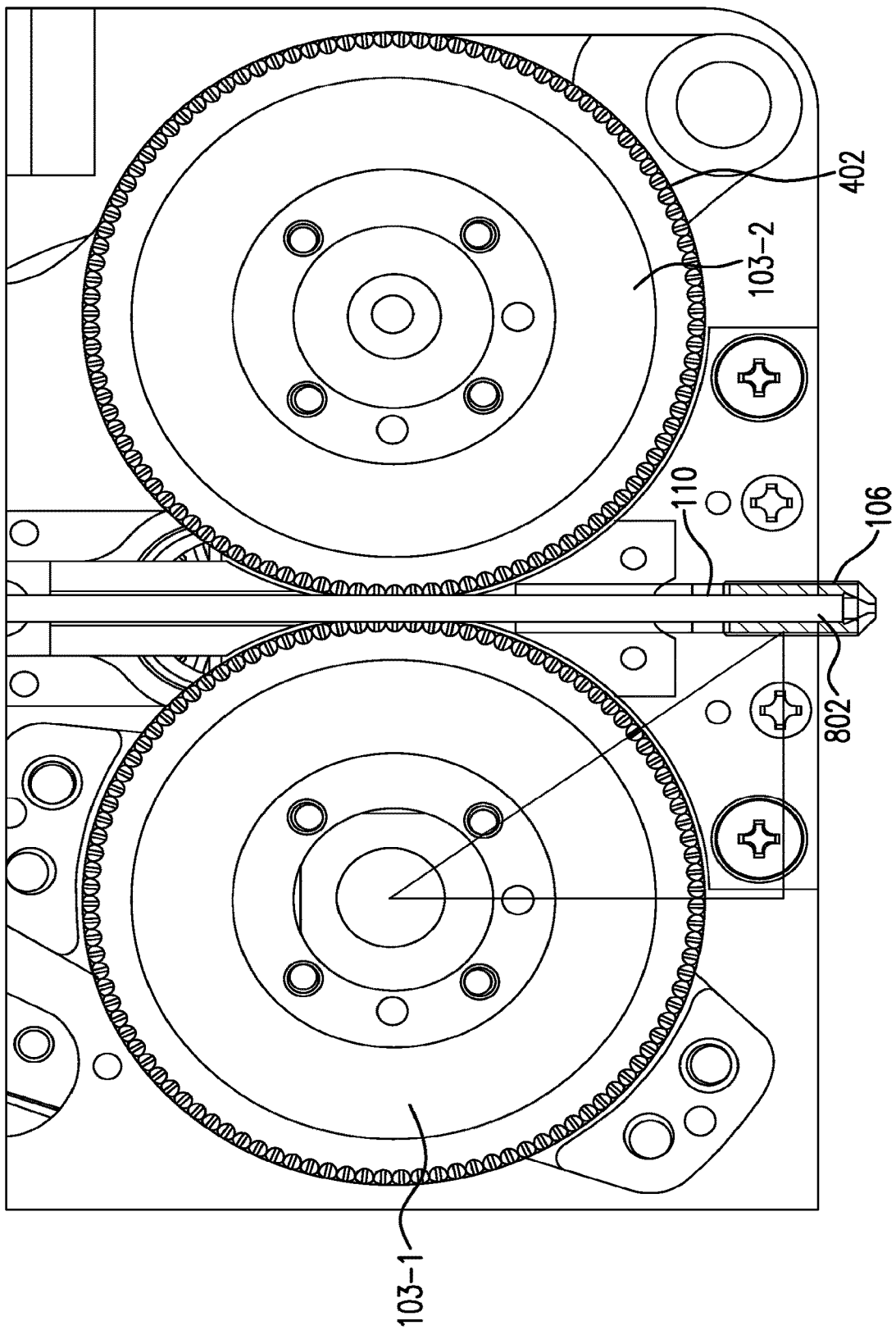
FIG. 9 illustrates a print head in an additive manufacturing system.

The physical association of the servo motor 602 and the hobs 103 and the melting capacity of the hot end may be managed in a variety of different ways in the embodiments. By way of example and as illustrated in the non-limiting embodiment of FIG. 9, the driven hob 103-1 and the non-driven 103-2 in the disclosed embodiments may be placed appreciably closer, on center axis, to a center point of the melt zone 802 of the hot end than in the known art. For example, in the known art, a hob's center axis may be approximately 400 millimeters from the center of the melt zone, and may, for example, pass through one or more feed tubes. In stark contrast and as illustrated in FIG. 9, in the disclosed embodiments the center axis of the hob may be approximately 20-40 mm, such as 25 millimeters, from the center point of the melt zone 802.

Figure 10:
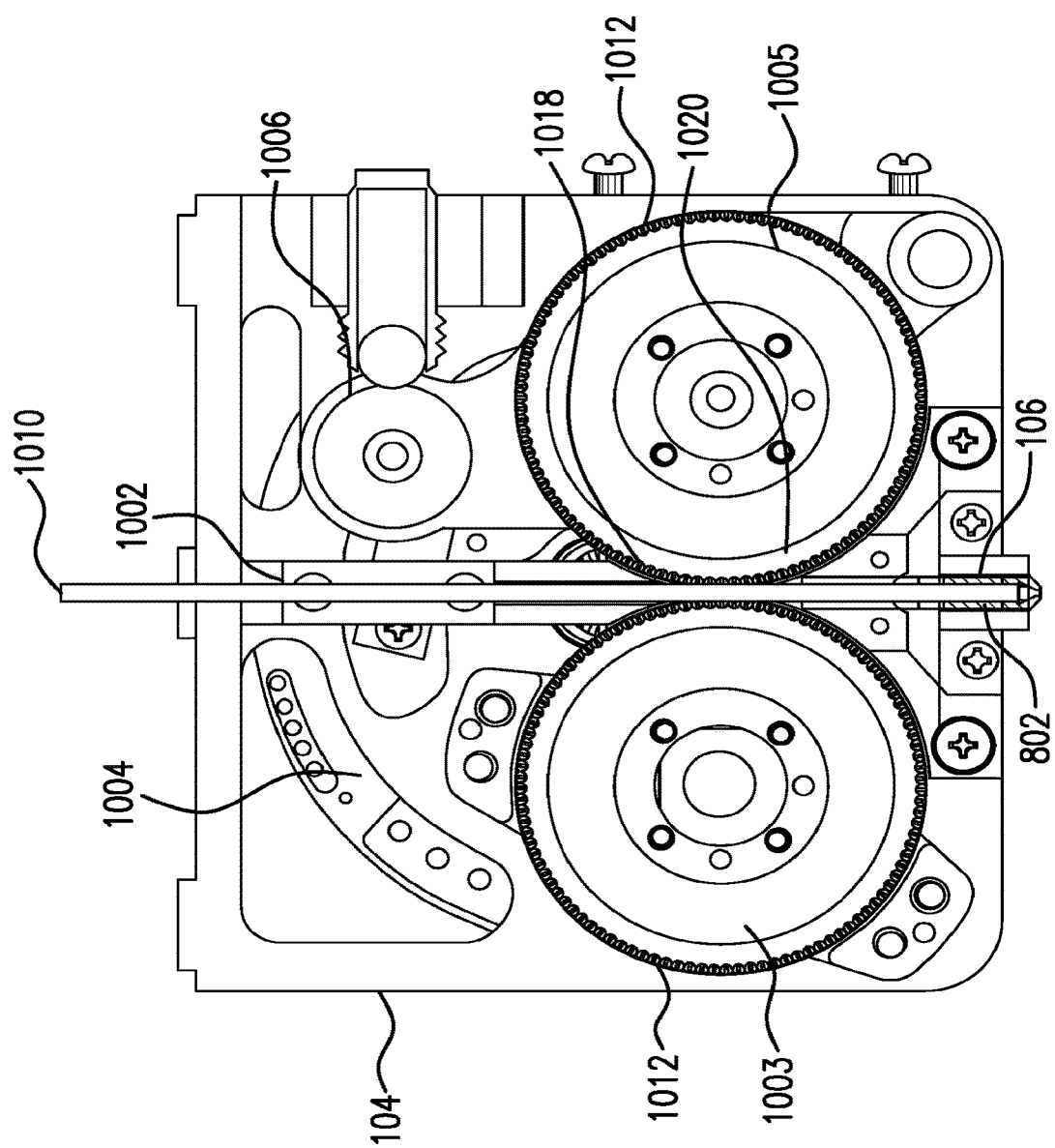
FIG. 10 illustrates a print head in an additive manufacturing system.

FIG. 10 illustrates the multiplicative positive effects gained through the use of multiple of the disclosed aspects in a single embodiment of a print head 104. As shown, a feed path 1002 approximately as tall as the print head 104 may be provided for maximum reduction in print material 110 pull. An encoded motor 1004 may be provided so that filament pull, grabbing, jamming, or crimping may be accounted for by adjustment of motor speed. A single driven hob 1003 may be provided, and may be mated with a spring loaded, cammed 1006 non-driven hob 1005 that presses against print material 110 of various sizes.

The illustrated embodiment may provide oversized ones of hobs 1003, 1005 to provide optimal horizontal grip length along the filament 1010, and the driven hob 1003 and the non-driven hob 1005 may each be provided with teeth 1012, wherein the teeth 1012 may be offset on each hob half so as to allow for maximum gripping between halves of a single hob and between hobs. The feed in 1018 to the hobs may be placed in close proximity to both the driven hob 1003 and the non-driven hob 1005. Additionally, the feed out 1020 from the head end 104 to the hot end may be provided very close to the hobs 1003, 1005, such that jamming, buckling, and crimping are prevented. And finally, the center point of the melt zone 802 of the hot end may be provided in close proximity along a lateral distance from a center axis of the driven hob 1003, such as in order to prevent buckling and jamming.

Moreover, motor 1004 and the controls thereof may be sufficiently fast, powerful, and refined so as to mechanically "oscillate" the filament 1010. Oscillation may impart energy to the filament and the melt, thereby enhancing adhesion and/or uniformity upon printing. Oscillation may additionally help the melt to flow, such as by decreasing the non-melt zone at the interface with the melt zone as those phrases are discussed above, and may also help in mixing and/or bonding the melt particles, such as to allow for the use of multi-filament prints based on in-melt mixing. Further, heat transfer/coupling to the melt from the heat source may additionally be enhanced by oscillation.

Methodologies of oscillating the filament 1010, in addition to high speed use or dithering of the motor 1004, may also include electromagnetic stimulation or physical vibration of the hot end such as through placement of one or more coils about the nozzle 106 of hot end rather than shaking the hot end/nozzle. Exemplary oscillation frequencies in the embodiments may range from approximately 15 kHz to approximately 120 kHz.

Figure 11:
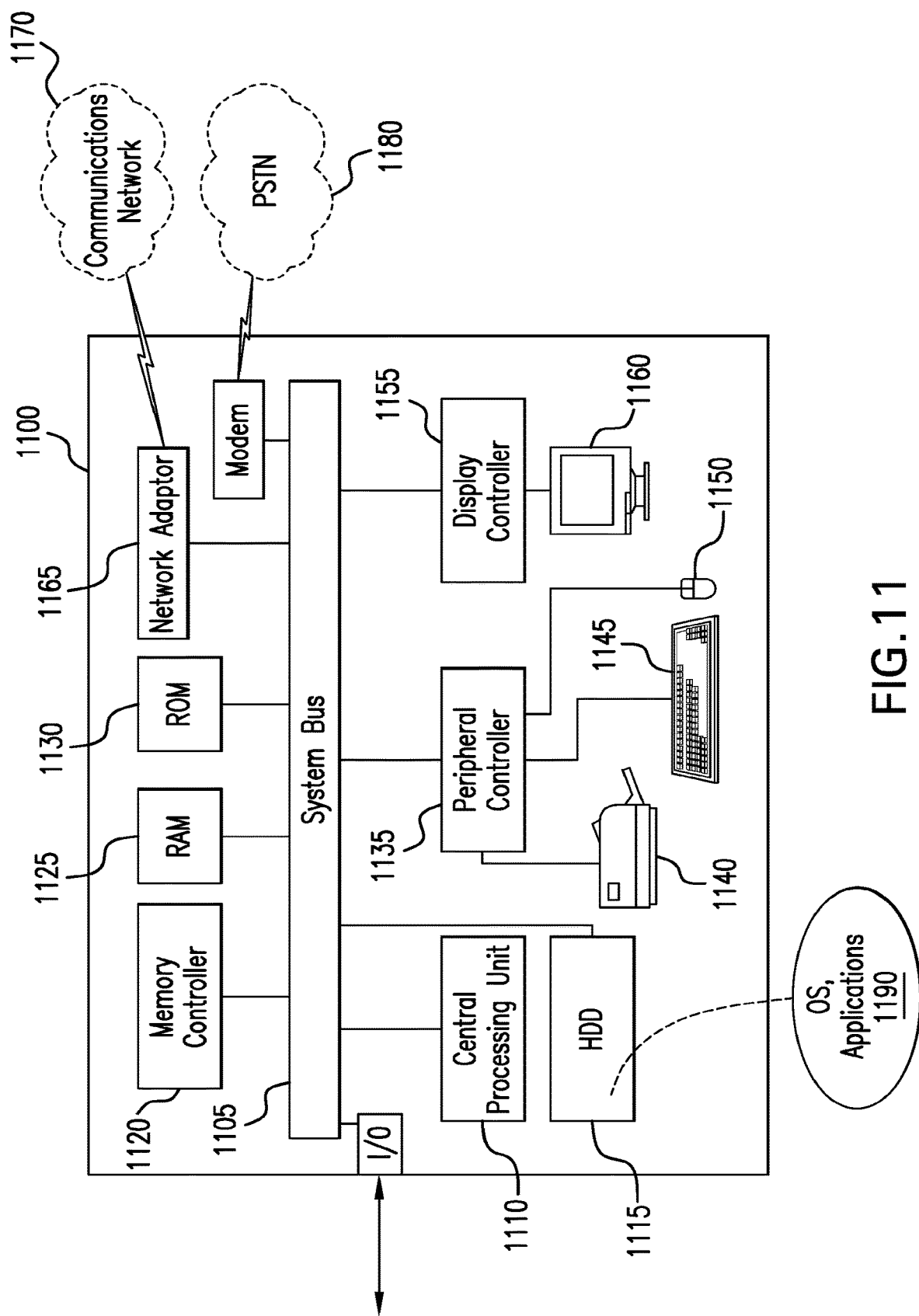
FIG. 11 illustrates an exemplary computing system.

FIG. 11 depicts an exemplary computing system 1100 for use in association with the herein described systems and methods. Computing system 1100 is capable of executing software, such as an operating system (OS) and/or one or more computing applications 1190, such as applications applying the algorithms 104*a* discussed herein, and may execute such applications, such as to control one or more hob motors by sending data from, and by using data, such as sensor data, received at, the I/O port.

The operation of exemplary computing system 1100 is controlled primarily by computer readable instructions, such as instructions stored in a computer readable storage medium, such as hard disk drive (HDD) 1115, optical disk (not shown) such as a CD or DVD, solid state drive (not shown) such as a USB "thumb drive," or the like. Such instructions may be executed within central processing unit (CPU) 1110 to cause computing system 1100 to perform the operations discussed throughout. In many known computer servers, workstations, personal computers, and the like, CPU 1110 is implemented in an integrated circuit called a processor.

It is appreciated that, although exemplary computing system 1100 is shown to comprise a single CPU 1110, such description is merely illustrative, as computing system 1100 may comprise a plurality of CPUs 1110. Additionally, computing system 1100 may exploit the resources of remote CPUs (not shown), for example, through communications network 1170 or some other data communications means.

In operation, CPU 1110 fetches, decodes, and executes instructions from a computer readable storage medium, such as HDD 1115. Such instructions may be included in software such as an operating system (OS), executable programs, and the like. Information, such as computer instructions and other computer readable data, is transferred between components of computing system 1100 via the system's main data-transfer path. The main data-transfer path may use a system bus architecture 1105, although other computer architectures (not shown) can be used, such as architectures using serializers and deserializers and crossbar switches to communicate data between devices over serial communication paths. System bus 1105 may include data lines for sending data, address lines for sending addresses, and control lines for sending interrupts and for operating the system bus. Some busses provide bus arbitration that regulates access to the bus by extension cards, controllers, and CPU 1110.

Memory devices coupled to system bus 1105 may include random access memory (RAM) 1125 and/or read only memory (ROM) 1130. Such memories include circuitry that allows information to be stored and retrieved. ROMs 1130 generally contain stored data that cannot be modified. Data stored in RAM 1125 can be read or changed by CPU 1110 or other hardware devices. Access to RAM 1125 and/or ROM 1130 may be controlled by memory controller 1120. Memory controller 1120 may provide an address translation function that translates virtual addresses into physical addresses as instructions are executed. Memory controller 1120 may also provide a memory protection function that isolates processes within the system and isolates system processes from user processes. Thus, a program running in user mode may normally access only memory mapped by its own process virtual address space; in such instances, the program cannot access memory within another process' virtual address space unless memory sharing between the processes has been set up.

In addition, computing system 1100 may contain peripheral communications bus 135, which is responsible for communicating instructions from CPU 1110 to, and/or receiving data from, peripherals, such as peripherals 1140, 1145, and 1150, which may include printers, keyboards, and/or the sensors, encoders, and the like discussed herein throughout. An example of a peripheral bus is the Peripheral Component Interconnect (PCI) bus.

Display 1160, which is controlled by display controller 1155, may be used to display visual output and/or presentation generated by or at the request of computing system 1100, responsive to operation of the aforementioned computing program. Such visual output may include text, graphics, animated graphics, and/or video, for example. Display 1160 may be implemented with a CRT-based video display, an LCD or LED-based display, a gas plasma-based flat-panel display, a touch-panel display, or the like. Display controller 1155 includes electronic components required to generate a video signal that is sent to display 1160.

Further, computing system 1100 may contain network adapter 1165 which may be used to couple computing system 1100 to external communication network 1170, which may include or provide access to the Internet, an intranet, an extranet, or the like. Communications network 1170 may provide user access for computing system 1100 with means of communicating and transferring software and information electronically. Additionally, communications network 1170 may provide for distributed processing, which involves several computers and the sharing of workloads or cooperative efforts in performing a task. It is appreciated that the network connections shown are exemplary and other means of establishing communications links between computing system 1100 and remote users may be used.

Network adaptor 1165 may communicate to and from network 1170 using any available wired or wireless technologies. Such technologies may include, by way of non-limiting example, cellular, Wi-Fi, Bluetooth, infrared, or the like.

It is appreciated that exemplary computing system 1100 is merely illustrative of a computing environment in which the herein described systems and methods may operate, and does not limit the implementation of the herein described systems and methods in computing environments having differing components and configurations. That is to say, the concepts described herein may be implemented in various computing environments using various components and configurations.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A print head used for additive manufacturing with print filament, comprising:
   a nozzle having an interior chamber extending between first and second longitudinal ends thereof and providing a melt zone therein, wherein the print filament is fed into the first longitudinal end of the nozzle, into the interior chamber, is heated in the melt zone, and is extruded from the second longitudinal end of the nozzle;
   two proximate hobs suitable to receive and feed therebetween into the first longitudinal end the print filament for the additive manufacturing, each of the two hobs comprising two opposing halves, wherein each of the respective hob's two halves comprises teeth that are offset with respect to the teeth of the opposing hob half; and
   a motor capable of imparting a rotation to at least one of the two hobs, wherein the extrusion results from the rotation.

2. The printhead of claim 1, wherein the two proximate hobs each have a diameter of about 20 mm.

3. The printhead of claim 1, wherein the two hobs each have a diameter greater than 20 mm.

4. The printhead of claim 1, wherein the motor comprises a servo motor having a shaft connected to one of the two hobs to directly impart the rotation thereon.

5. The printhead of claim 1, wherein the two hobs each have a diameter in a range of 20-40 mm.

6. The printhead of claim 1, further comprising a shim between each pair of the hob halves.

7. The printhead of claim 6, wherein the shim provides a predetermined grip level by the two hobs on the filament.

8. The printhead of claim 7, wherein the shim is manually adjustable.

9. The printhead of claim 1, wherein the motor rotates one of the two hobs, and the hob not rotated by the motor comprises at least one adjustable threaded force element.

10. The printhead of claim 9, wherein the at least one adjustable threaded force element further comprises a spring loaded cam associated with a rotatable distance adjustment.

11. The printhead of claim 1, wherein a feed rate from the two hobs to the interior chamber comprises about 100 mm$^3$ per second.

12. The printhead of claim 1, further comprising an air feed for cooling.

13. The printhead of claim 1, wherein the teeth comprise sharpened surfaces.

14. The printhead of claim 1, wherein the teeth comprise non-sharpened surfaces.

15. The printhead of claim 14, wherein the non-sharpened surfaces comprise one of square or spherical surfaces.

16. The printhead of claim 1, wherein a lateral distance from a center axis of the hobs to a midpoint of the melt zone is approximately 25 millimeters.

17. The printhead of claim 15, further comprising at least one sensor that senses at least one of the motor, the hobs and the second longitudinal end.

18. The print head of claim 1, wherein the motor comprises a servo motor providing at least 500 Hz of servo-mechanical band width.

19. The print head of claim 1, further comprising at least one encoder associated with the motor.

* * * * *